(12) United States Patent
Ikeda

(10) Patent No.: US 11,994,909 B2
(45) Date of Patent: May 28, 2024

(54) ELECTRONIC DEVICE, ELECTRONIC SYSTEM, AND SENSOR SETTING METHOD FOR AN ELECTRONIC DEVICE

(71) Applicant: Panasonic Intellectual Property Management Co., Ltd., Osaka (JP)

(72) Inventor: Kotaro Ikeda, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 55 days.

(21) Appl. No.: 17/137,597

(22) Filed: Dec. 30, 2020

(65) Prior Publication Data
US 2022/0206534 A1 Jun. 30, 2022

(51) Int. Cl.
*G06F 1/16* (2006.01)

(52) U.S. Cl.
CPC .......... *G06F 1/1647* (2013.01); *G06F 1/1658* (2013.01)

(58) Field of Classification Search
CPC .. G06F 3/0421; G06F 3/04883; G06F 1/1658; G06F 1/1647
See application file for complete search history.

(56) References Cited

U.S. PATENT DOCUMENTS

| | | | |
|---|---|---|---|
| 2010/0161506 A1* | 6/2010 | Bosenick | G06Q 30/02 705/347 |
| 2011/0310005 A1 | 12/2011 | Chen et al. | |
| 2013/0194238 A1 | 8/2013 | Sakai | |
| 2013/0265248 A1 | 10/2013 | Nagahara et al. | |
| 2013/0293454 A1 | 11/2013 | Jeon et al. | |
| 2014/0160505 A1 | 6/2014 | Tachikawa et al. | |
| 2017/0026069 A1* | 1/2017 | Kim | H04M 1/0254 |
| 2017/0147841 A1* | 5/2017 | Stagg | G06K 7/10405 |
| 2017/0336913 A1* | 11/2017 | Yoo | G06F 3/0488 |
| 2018/0097997 A1* | 4/2018 | Gotoh | B60R 1/00 |
| 2019/0139455 A1* | 5/2019 | O'Hara | G09B 25/02 |

FOREIGN PATENT DOCUMENTS

| | | |
|---|---|---|
| JP | 2013-145455 | 7/2013 |
| JP | 2013-218549 | 10/2013 |
| JP | 2013-235588 | 11/2013 |
| JP | 2014-036255 | 2/2014 |
| JP | 2018-181351 | 11/2018 |
| WO | 2016/120887 | 8/2016 |

OTHER PUBLICATIONS

Extended European Search Report dated Jun. 17, 2021 in corresponding European Patent Application No. 20217730.9.

* cited by examiner

*Primary Examiner* — Abbas I Abdulselam
(74) *Attorney, Agent, or Firm* — Wenderoth, Lind & Ponack, L.L.P.

(57) ABSTRACT

An electronic device is installed in a given space and comprises a main body, one or more sensors, and a controller. The one or more sensors are configured to detect an object around the main body. The controller is configured to set a detection range of the one or more sensors according to an installation state of the main body in the given space.

14 Claims, 10 Drawing Sheets

ELECTRONIC DEVICE, ELECTRONIC SYSTEM, AND SENSOR SETTING METHOD FOR AN ELECTRONIC DEVICE

TECHNICAL FIELD

The present disclosure relates to an electronic device configured to be installed in a given space, an electronic system, and a sensor setting method for an electronic device.

BACKGROUND ART

Transportation means such as aircraft and trains are often equipped with display devices that are individually used by passengers and crew members. Transportation means have internal spaces where structures such as seats and walls exist. Such structures have a variety of shapes. Therefore, in order to be installed in conformity with a variety of surrounding structures, display devices are required to change, for example, their positions or orientations or how they are fixed to the surrounding structures.

In recent years, display devices may include proximity sensors for touch panel operations and user motion recognition, as disclosed in, for example, JP2014-036255A and JP2018-181351A.

Due to a shape of a structure in the space where a display device is installed, the structure may block detection of proximity sensors. This can cause the proximity sensors to operate incorrectly.

The present disclosure relates to an electronic device, an electronic system, and a sensor setting method for an electronic device, which is effective for maintaining a proper operation of a sensor of the electronic device when the electronic device is installed in a given space.

SUMMARY

An electronic device according to the present disclosure is an electronic device configured to be installed in a given space, and comprises a main body, one or more sensors, and a controller. The sensor is configured to detect an object around the main body. The controller is configured to set a detection range of the one or more sensors according to an installation state of the main body in the given space.

An electronic system according to the present disclosure comprises one or more electronic devices and a server configured to connect to the one or more electronic devices. The server is configured to acquire information indicating the installation state of the main body of each of the one or more electronic devices in the given space and request each of the one or more electronic devices to set the detection range of the one or more sensors according to the installation state.

A sensor setting method for an electronic device according to the present disclosure is a method for setting a sensor of an electronic device configured to be installed in a given space, the electronic device including one or more sensors for detecting an object around a main body of the electronic device. The sensor setting method includes acquiring information indicating an installation state of the electronic device in the given space, and setting a detection range of the one or more sensors according to the installation state.

DETAILED DESCRIPTION

Hereinafter, embodiments will be described in detail, with reference to the drawings when appropriate. Any explanations deemed unnecessary may be omitted. For example, detailed descriptions of well-known aspects or duplicate descriptions of substantially identical components may be omitted from this disclosure. This is to avoid unnecessary redundant description in the following and to facilitate understanding by those skilled in the art.

It is to be noted that the attached drawings and the following description are provided to enable those skilled in the art to fully understand the present disclosure, and they are not intended to limit the claimed subject matter.

Figure 1:
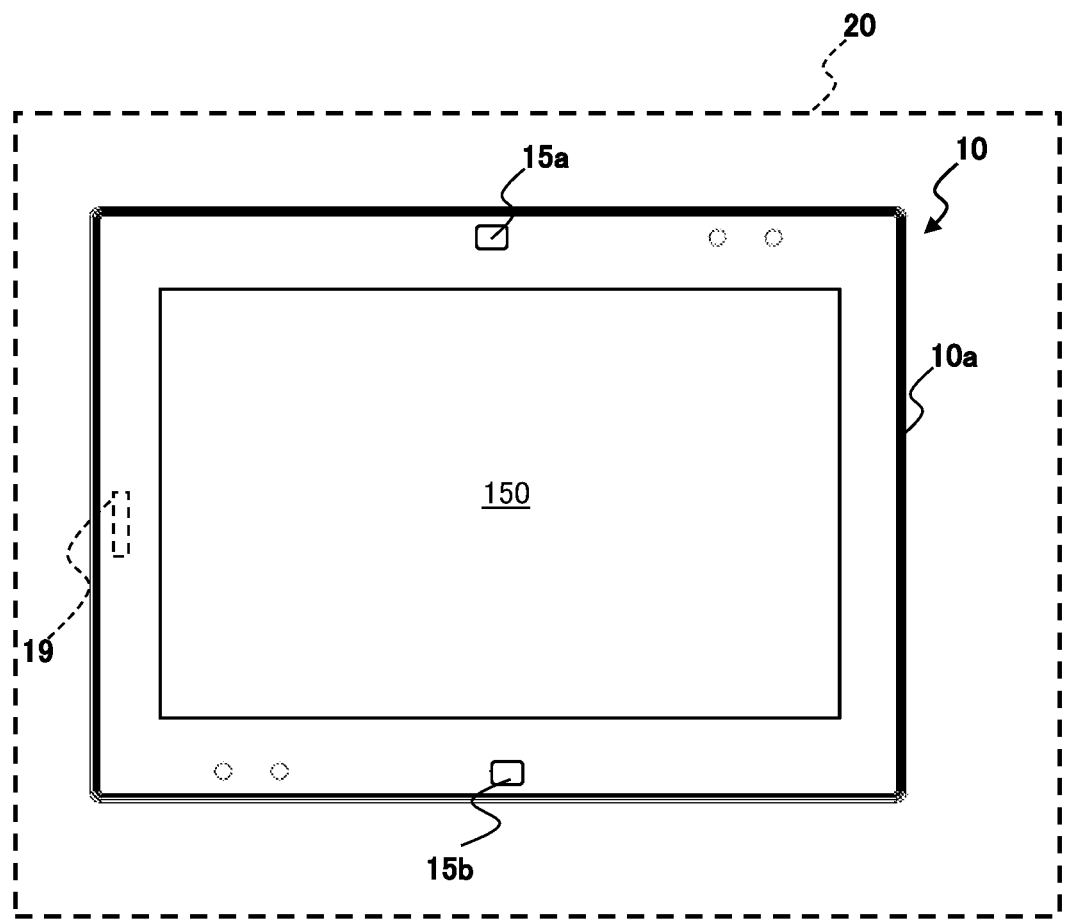
FIG. 1 is a plan view of a display device.

FIG. 1 shows an example of an installation state of a display device 10. The display device 10 is covered with a surface member 20 such as wallpaper. Only information displayed on the screen 150 is visible through the surface member 20. The display device 10 installed in this manner can allow only information to be brought to a surface of the surface member 20 so that a user feels no presence of the display device 10 and its screen 150. This improves the design of a space where the display device 10 is installed.

The display device 10 includes proximity sensors 15a and 15b arranged vertically. The proximity sensors 15a and 15b detect, for example, if a user's hand has come close to the screen 150 through the surface member 20. In response to this detection, a user's input operation is determined and an input process is executed.

When the display device 10 is installed in a given space, the installation orientation of the display device 10 is changed depending on a structure around the display device. For example, as illustrated in FIGS. 4A and 4B, a pair of display devices 10 arranged on the right and left sides are installed in a structure having an upper wall 2U protruding further than a lower wall 2L.

Figure 2:
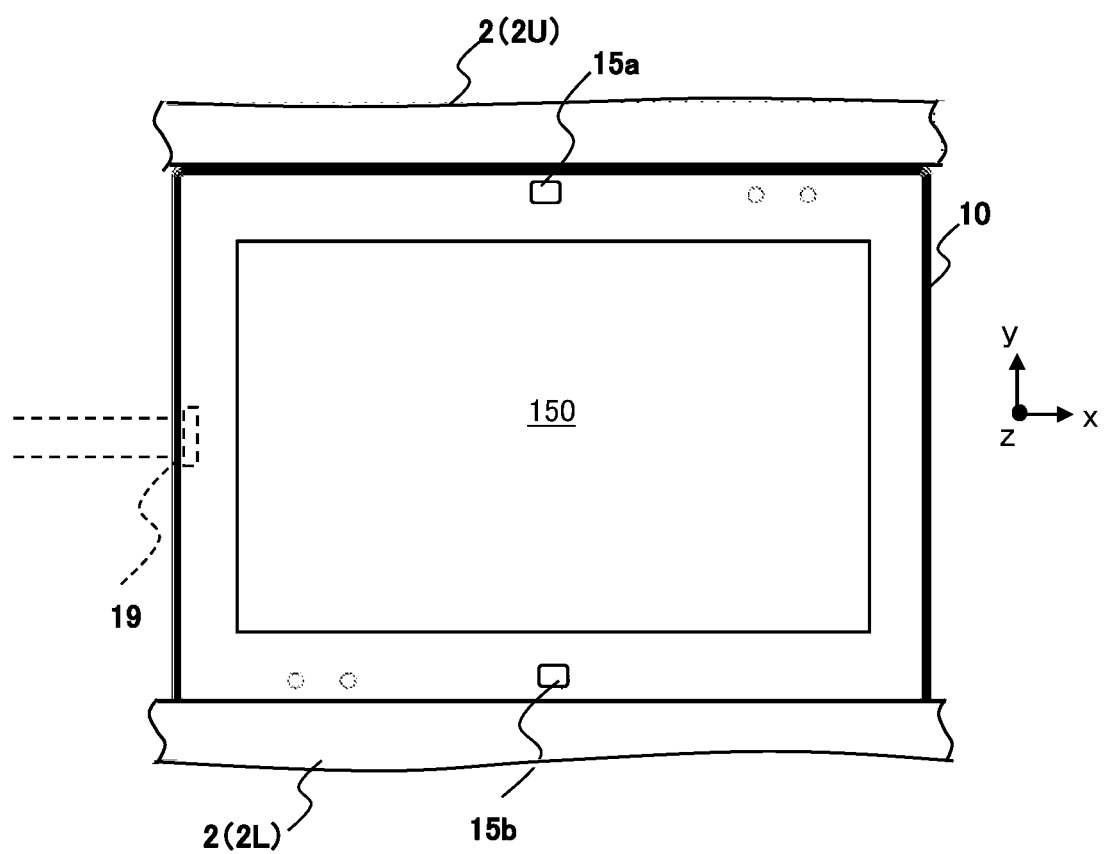
FIG. 2 is a plan view showing an installation state of the display device.
Figure 3:
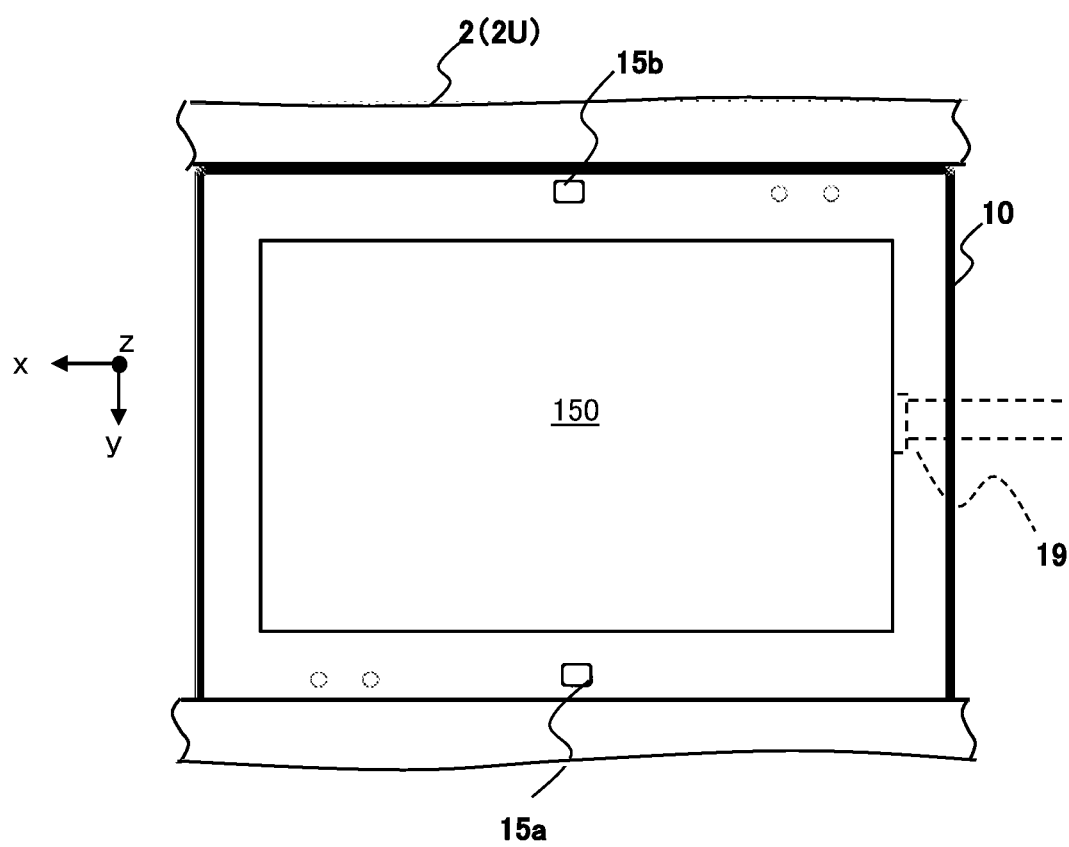
FIG. 3 is a plan view showing another installation state of the display device.
Figure 4A:
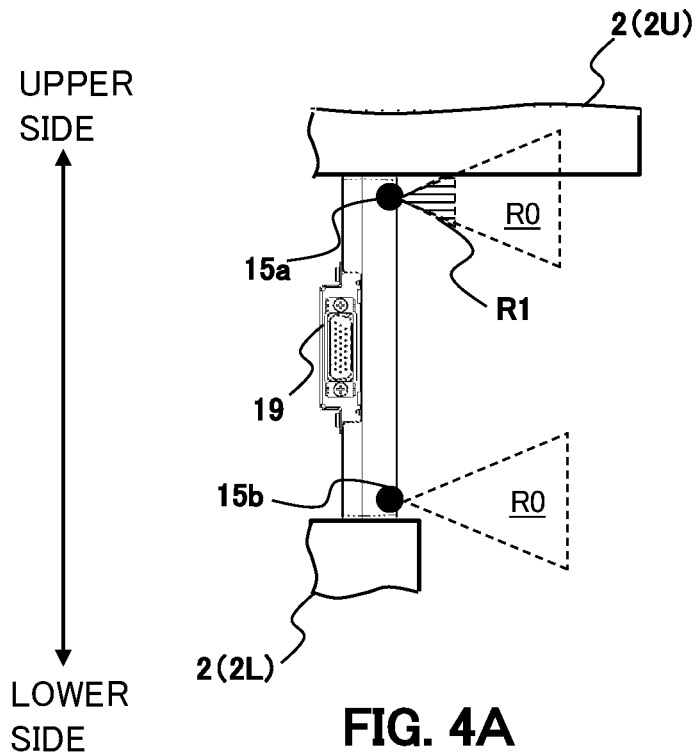
FIG. 4A is a side view showing a partial cross section of an installation state of the display device.
Figure 4B:
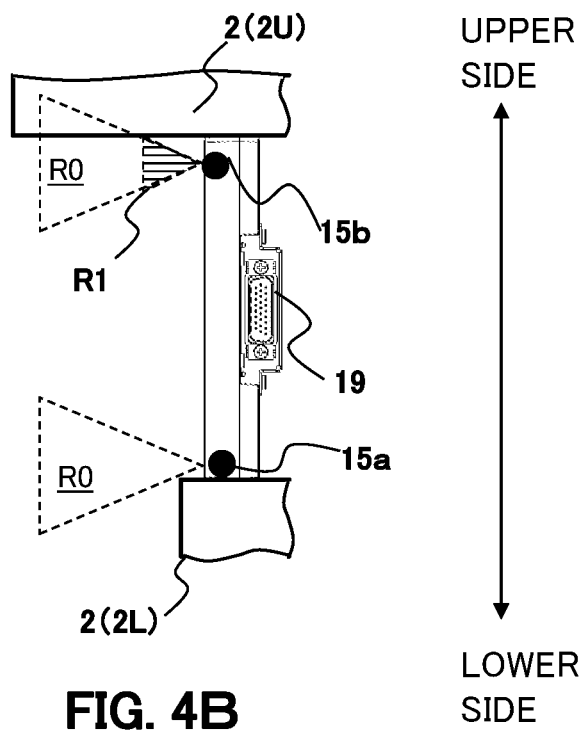
FIG. 4B is a side view showing a partial cross section of another installation state of the display device.

The display device 10 on the left side is installed as illustrated in FIGS. 2 and 4A such that a connection terminal 19 is disposed on the left side where a power supply and a communication line are disposed. In this case, the proximity sensor 15a is disposed on the upper side, and the proximity sensor 15b is disposed on the lower side. Hereinafter, this installation orientation is referred to as a first orientation. In this case, as illustrated in FIG. 4A, the overhanging upper wall 2U partially blocks a detection range R0 of the upper proximity sensor 15a. The display device 10 on the right side is installed as illustrated in FIGS. 3 and 4B such that the connection terminal 19 is disposed on the right side where the power supply and the communication line are disposed. In this case, the proximity sensor 15b is disposed on the upper side, and the proximity sensor 15a is disposed on the lower side. Hereinafter, this installation orientation is referred to as a second orientation. In this case, as illustrated in FIG. 4B, the overhanging upper wall 2U partially blocks a detection range R0 of the upper proximity sensor 15b.

As a result, the proximity sensors 15a and 15b may not be able to properly detect a user's hand or the like coming closer. As one option to avoid this, the detection range of the proximity sensor 15a or 15b in which the detection range R0 is partially blocked may be reduced. However, the proximity sensor 15a or 15b in which the detection range R0 is partially blocked differs depending on the installation orientation of the display device 10.

In the present embodiment, the display device 10 is capable of maintaining a proper operation of a proximity sensor even if the installation orientation of the display device 10 is changed. Hereinafter, embodiments will be described with reference to the drawings as appropriate.

1. Embodiment 1

1-1. Configuration

1-1-1. Configuration of Electronic System

Figure 5:
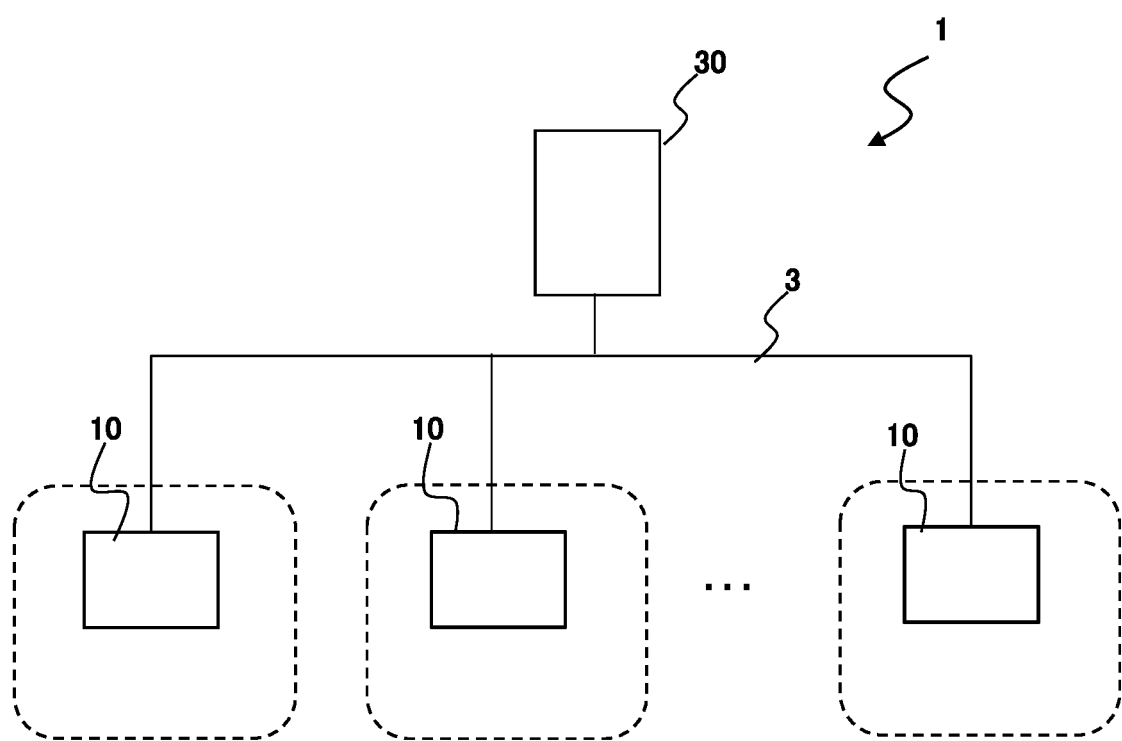
FIG. 5 schematically shows a configuration of an electronic system according to Embodiment 1.

FIG. 5 schematically shows a configuration of an electronic system 1 according to Embodiment 1. The electronic system 1 is, for example, a network system installed and used in an aircraft. The electronic system 1 comprises a plurality of display devices 10 (an example of an electronic device) and a server 30. The display devices 10 are installed in structures such as walls or seats in spaces inside the aircraft. Each display device 10 connects to the server 30 by a wireless or wired network 3. A user such as a passenger or a crew member operates the display device 10 to display various information on the screen 150.

1-1-2. Configuration of Display Device

Figure 6:
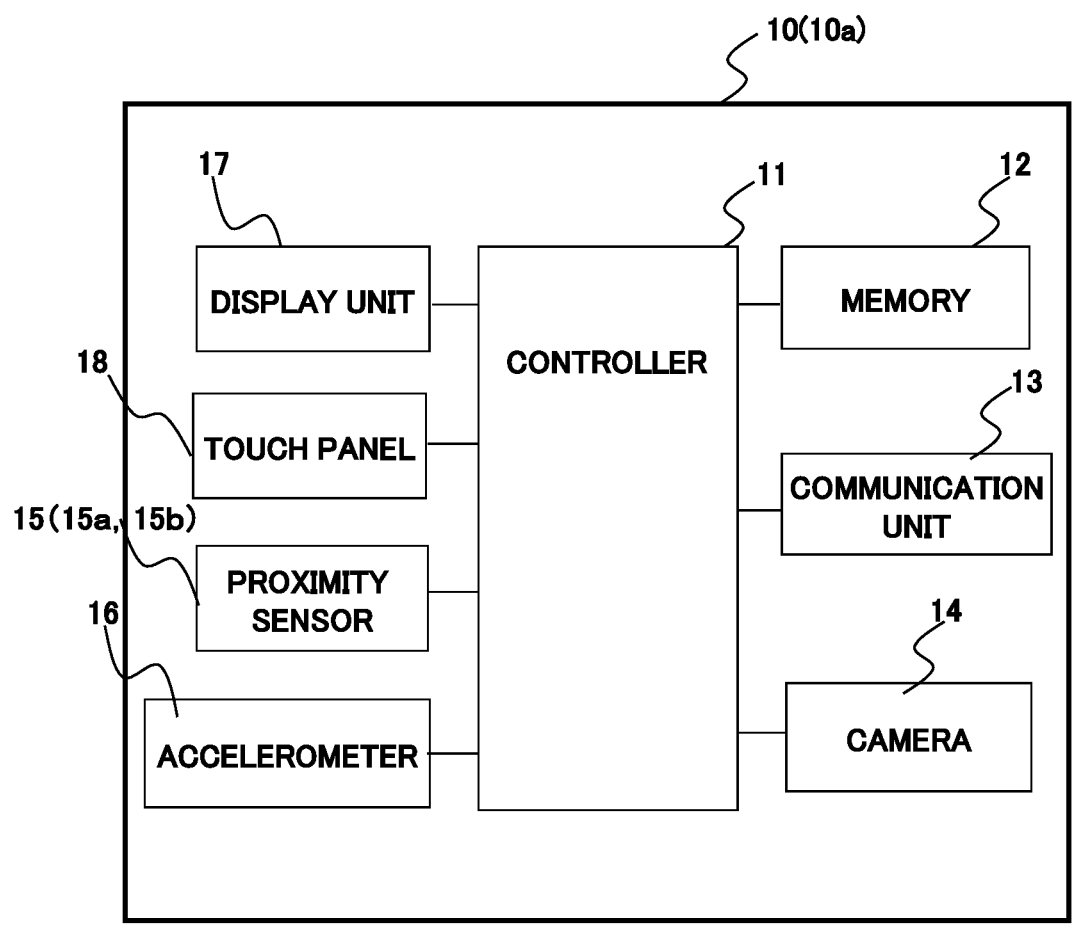
FIG. 6 shows a configuration of a display device according to Embodiment 1.

As illustrated in FIG. 6, the display device 10 includes a display main body 10a (FIG. 1). The display device 10 comprises a controller 11, a memory 12, a communication unit 13, a camera 14, a proximity sensor 15 (15a, 15b), an accelerometer 16, a display unit 17, and a touch panel 18.

The controller 11 functions as an arithmetic processor unit and a controlling unit, and controls the overall operation of the display device 10 according to computer programs. The controller 11 includes electronic circuitry such as a CPU or a microprocessor. As will be described later, the controller 11 adjusts sensitivity of the proximity sensor 15a or 15b to set a detection range of the proximity sensor in accordance with a request from the server 30. The controller 11 compares electric signals from the proximity sensors 15a and 15b with a predetermined determination threshold value to determine whether or not an object is close to the proximity sensor 15a or 15b. The determination threshold value is, for example, a threshold value set for signal intensity and/or a detection time of the signals detected by the proximity sensors 15a and 15b.

The memory 12 includes a memory such as a RAM or a ROM. The controller 11 reads computer programs stored in the ROM or other memory into the RAM and executes the computer programs to execute the functions of the display device 10.

The communication unit 13 includes, for example, a network interface such as a network card. The communication unit 13 connects to the network 3 (FIG. 5) by wire or wirelessly to transmit and receive data to and from the server 30 on the network 3.

The camera 14 includes a lens and an image sensor. The camera 14 captures an image of an area in front of the display main body 10a.

The proximity sensors 15a and 15b are arranged so that the detection ranges of the proximity sensors cover the area in front of the display main body 10a. The proximity sensors 15a and 15b detect if an object is in their proximity, that is, detect whether or not an object is within a predetermined distance from a front surface of the display main body 10a. The proximity sensors 15a and 15b are arranged on an upper side and a lower side of the display device 10 as illustrated in FIG. 1.

The proximity sensors 15a and 15b are, for example, infrared proximity sensors. The proximity sensors 15a and 15b each include a light emitting element such as an LED that emits infrared rays and a light receiving element that converts received light into an electric signal. If an object (for example, a user's hand) exists in front of the display main body 10a, the controller 11 receives an electric signal converted from light reflected by the object. If the controller 11 detects the electric signal with the intensity equal to or higher than a predetermined value and detects such electric signal for more than a predetermined time, it is determined that the object exists within the predetermined distance. The controller 11 can adjust sensitivity of the proximity sensors 15a and 15b to set the detection ranges of the proximity sensors. Adjusting the sensitivity of the proximity sensors 15a and 15b includes, for example, adjusting an amplification degree of an amplifier that amplifies an electric signal from the light receiving element, or adjusting a light emitting output (for example, a parameter for intensity of infrared rays) of the light emitting element.

The proximity sensors 15a and 15b are used to detect if a user's hand is in their proximity and the position of the user's hand, according to which an input operation is performed. For example, in a state where the screen 150 (FIG. 1) of the display device 10 is OFF, the controller 11 may turn ON the screen 150 when having determined that a user's hand is in proximity based on the electric signal from the proximity sensor 15a or 15b. For example, as disclosed in JP2018-181351A, the controller 11 may determine a vertical or horizontal movement of a user's hand based on a time difference of the electric signal from the proximity sensor 15a or 15b to perform a process such as scrolling or page change on the screen 150.

The accelerometer 16 (an example of a state detection unit) is, for example, a three-axis type accelerometer. The accelerometer 16 may be a piezoresistive type or a capacitance type. The accelerometer 16 detects X, Y, and Z axis directions (including the direction of gravity). The controller 11 determines an installation orientation of the display device 10 (display device main body 10a) based on an electric signal from the accelerometer 16. For example, when the display device 10 is in the state illustrated in FIG. 2, the controller 11 determines that the display device 10 is installed in the first orientation. When the display device 10 is in the state illustrated in FIG. 3, the controller 11 determines that the display device 10 is installed in the second orientation.

The display unit 17 includes the screen 150 (FIG. 1) to output information in the form of a still image, a moving image, a text, or the like. The display unit 17 is, for example, a liquid crystal display device, an organic EL (Electro Luminescence) display device, or the like.

The touch panel 18 is layered on the display unit 17 to function as a touch screen. The touch panel 18 converts, for example, a pressure applied to a specific portion on the screen 150 or a change of capacitance generated in a specific portion of the display unit 17 into an electric input signal. The touch panel 18 then notifies the controller 11 of a location of the detected specific portion.

1-1-3. Configuration of Server

Figure 7:
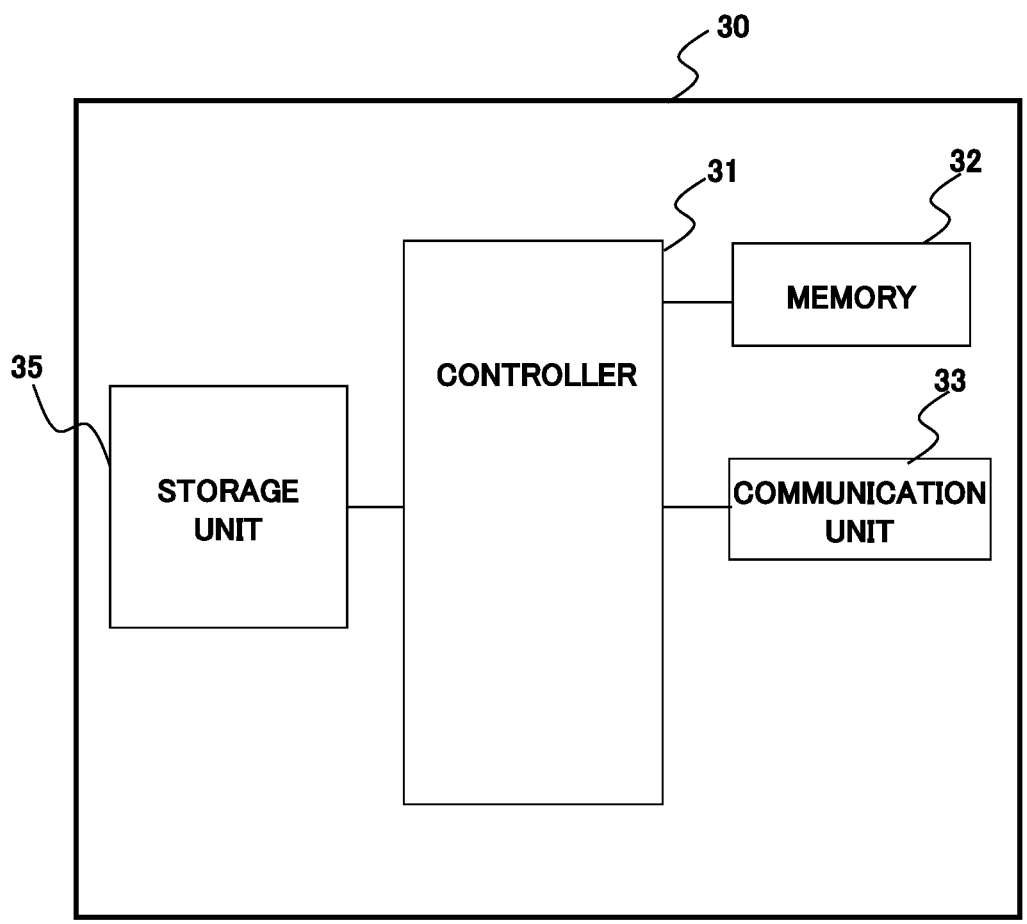
FIG. 7 shows a configuration of a server according to Embodiment 1.

As illustrated in FIG. 7, the server 30 is a computer device including a controller 31, a memory 32, a communication unit 33, and a storage unit 35.

The controller 31 functions as an arithmetic processor unit and a controlling unit, and controls the overall operation of the server 30 according to computer programs. The controller 31 includes electronic circuitry such as a CPU or a microprocessor.

The memory 32 includes a memory such as a RAM or a ROM. The controller 31 reads computer programs stored in the ROM or other memory into the RAM and executes the computer programs to execute the functions of the server 30.

The communication unit 33 includes, for example, a network interface such as a network card. The communication unit 33 connects to the network 3 (FIG. 5) by wire or wirelessly to transmit and receive data to and from a plurality of display devices 10 on the network 3.

The storage unit 35 includes a magnetic disk or semiconductor memory. The storage unit 35 stores application programs to be executed by the server 30 and various data including content data to be distributed to the display devices 10. The storage unit 35 may be a data server or a content server, which is separate from the server 30 and connects to the server 30.

Figure 10A:
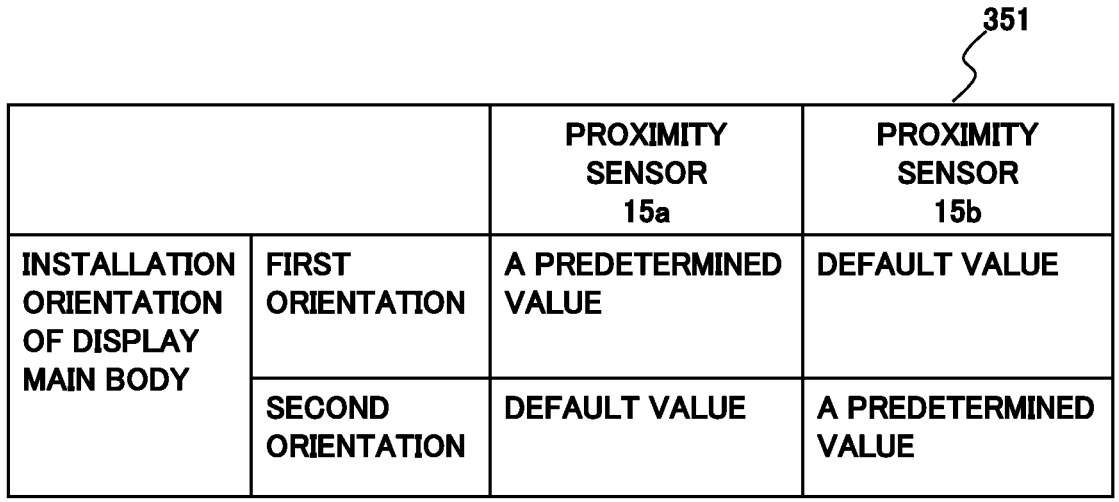
FIG. 10A shows sensor setting information according to Embodiment 1.
Figure 10B:
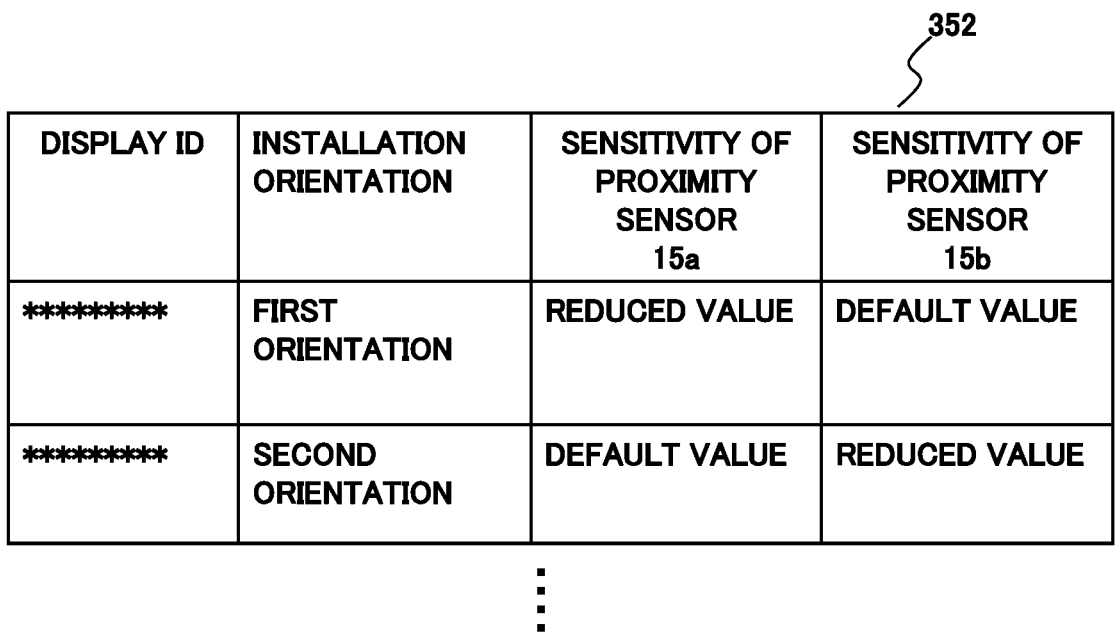
FIG. 10B shows display device installation information according to Embodiment 1

The storage unit 35 stores sensor setting information 351 illustrated in FIG. 10A and display device installation information 352 illustrated in FIG. 10B. The sensor setting information 351 stores set values (values of electric signals from the light receiving element, output values of the light emitting element, etc.) for adjusting the sensitivities of the proximity sensors 15a and 15b in accordance with an installation orientation of the display device 10. These set values are input and stored in advance in consideration of a degree to which an installation condition of the display device 10 such as a wall overhang, a wall dent, etc. affects the detection ranges of the proximity sensors 15a and 15b. As will be described later, the proximity sensor 15a or 15b reduces its sensitivity to a predetermined value according to an installation orientation of the display device 10. The display device installation information 352 holds an installation orientation of each display device 10 and a set value of the sensitivity of the proximity sensor 15a or 15b. When the display device 10 is installed, installation information for the display device 10 is added to the display device installation information 352.

1-2. Operation

An example will be described in a case where an installation condition is as illustrated in FIGS. 4A and 4B. Here, the operation of the electronic system 1 will be described when the display device 10 is installed in a structure where the upper wall 2U protrudes further than the lower wall 2L.

In the electronic system 1, the server 30 acquires information indicating an installation orientation of each display device 10, and lowers sensitivity of either the proximity sensor 15a or the proximity sensor 15b according to the installation orientation. When the installation orientation of the display device 10 is the first orientation as illustrated in FIG. 4A, the sensitivity of the proximity sensor 15a whose detection range is R0 (default value) is reduced to set the detection range to R1 (<R0). When the installation orientation of the display device 10 is the second orientation as illustrated in FIG. 4B, the sensitivity of the proximity sensor 15b whose detection range is R0 (default value) is reduced to set the detection range to R1 (<R0). As a result, regardless of whether the display device 10 is installed in the first orientation or the second orientation, it is possible to prevent detection of the proximity sensor 15a or 15b on the upper side from being blocked by the upper wall 2U and maintain a proper detection of the proximity sensors 15a and 15b.

The operations of the display device 10 and the server 30 will be described in detail below.

1-2-1. Operation of Display Device

Figure 8:
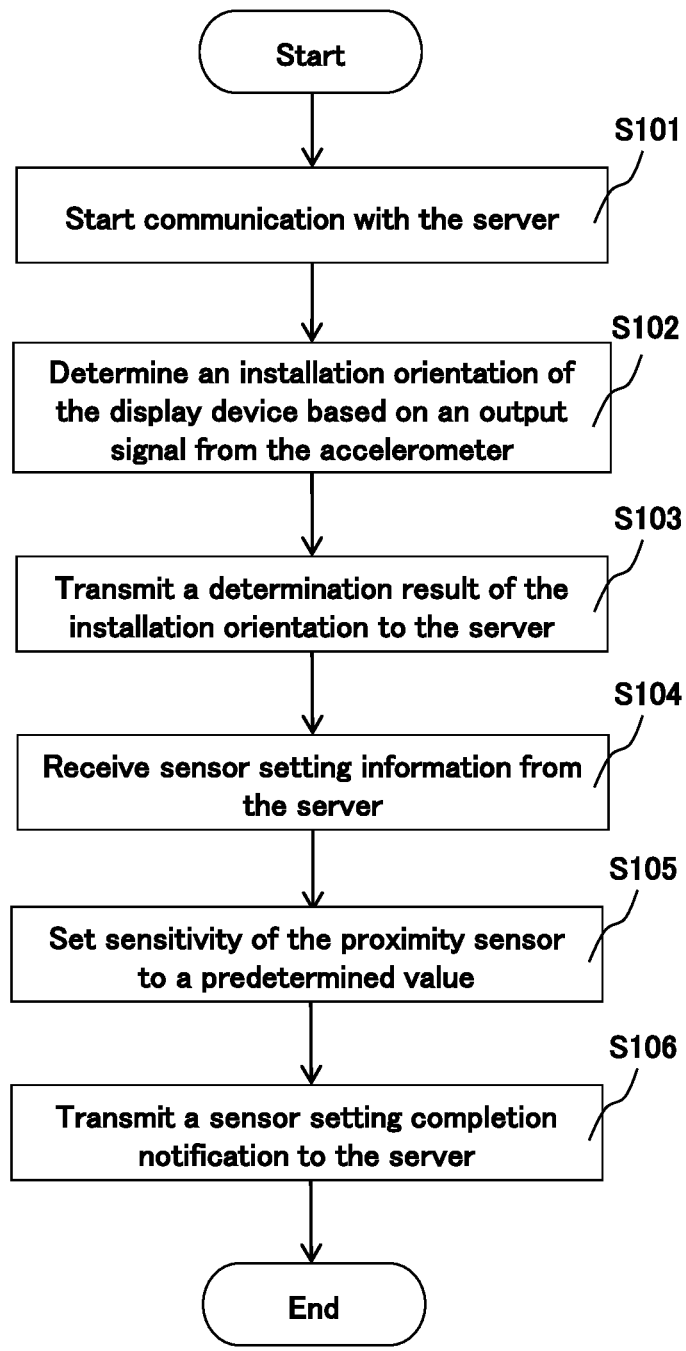
FIG. 8 is a flowchart showing an operation of the display device according to Embodiment 1.

The operation executed mainly by the controller 11 of the display device 10 illustrated in FIG. 6 will be described with reference to FIG. 8.

The display device 10 is installed as illustrated in FIG. 4A or FIG. 4B. When connected to the network 3, the display device 10 starts communication with the server 30 (S101). The display device 10 determines an installation orientation of the display device 10 based on an output signal from the accelerometer 16 (S102). The display device 10 transmits a determination result of the installation orientation, i.e. the first orientation or the second orientation, to the server 30 (S103).

The display device 10 receives, from the server 30, sensor setting information corresponding to the determined installation orientation in which the sensitivity of the proximity sensor 15a or 15b is to be set to a predetermined value (S104). The display device 10 sets the sensitivity of the proximity sensor 15a or 15b to a predetermined value according to the received sensor setting information (S105). As a result, when the display device 10 is installed in the first orientation as illustrated in FIG. 4A, the sensitivity of the proximity sensor 15a is reduced. When the display device 10 is installed in the second direction as illustrated in FIG. 4B, the sensitivity of the proximity sensor 15b is reduced.

The display device 10 transmits a sensor setting completion notification to the server 30 (S106).

1-2-2. Operation of Server

Figure 9:
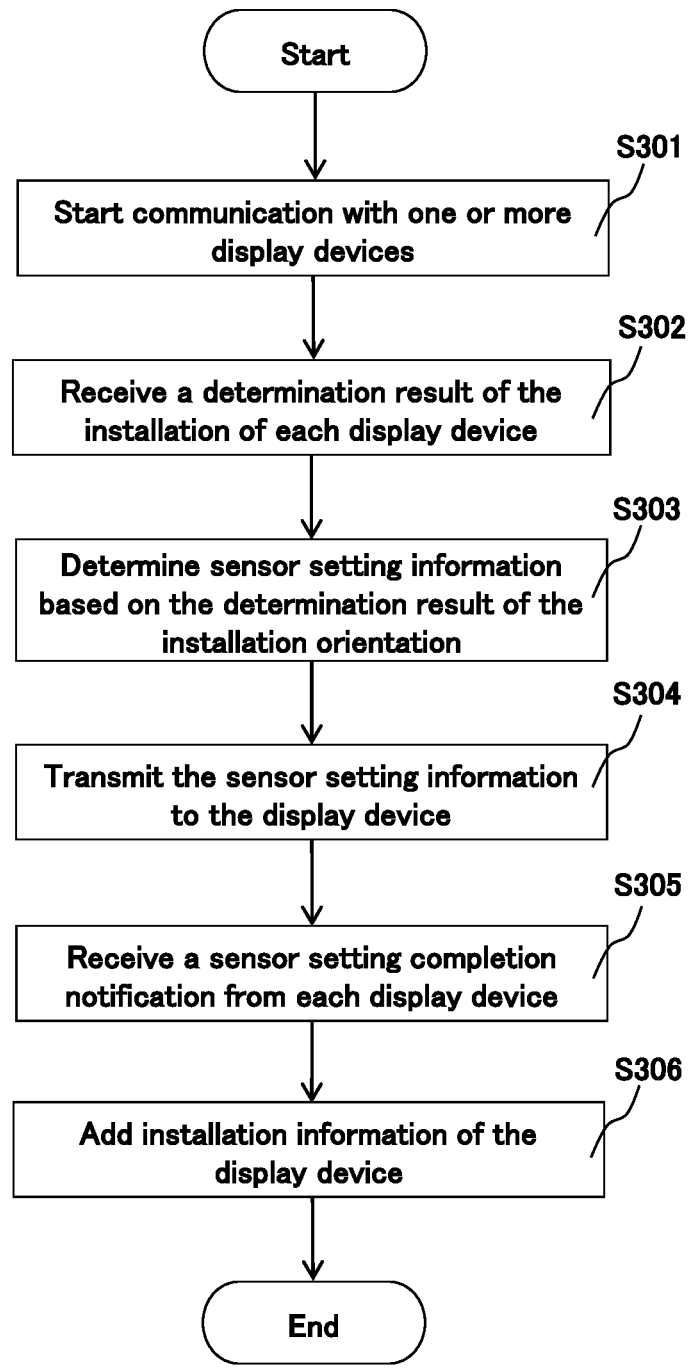
FIG. 9 is a flowchart showing an operation of the server according to Embodiment 1.

The operation mainly executed by the controller 31 of the server 30 illustrated in FIG. 7 will be described with reference to FIG. 9. The server 30 connects to a plurality of display devices 10 and executes the following processes for each display device 10.

The server 30 starts communication with the display device 10 (S301). The server 30 receives a determination result of the installation orientation from the connected display device 10 (S302). The server 30 refers to the sensor setting information 351 as illustrated in FIG. 10A and determines sensor setting information (S303). Specifically, when the determination result of the installation orientation is the "first orientation" (the orientation as illustrated in FIG. 4A), the server 30 determines to set the sensitivity of the proximity sensor 15a to a predetermined value. When the determination result of the installation orientation is the "second orientation" (the orientation as illustrated in FIG. 4B), the server 30 determines to set the sensitivity of the proximity sensor 15b to a predetermined value. The server 30 transmits the determined sensor setting information to the display device 10 (S304). Upon receiving a sensor setting completion notification from the display device 10 (S305), the server 30 adds installation information for the display device 10 to the display device installation information 352 (S306).

1-3. Modified Example

In this embodiment, the display device 10 may be provided with a single proximity sensor 15. For example, in Embodiment 1, the display device 10 may be provided with only the proximity sensor 15a. In this case, when the display device 10 is installed in the first orientation as illustrated in FIG. 4A, the sensitivity of the proximity sensor 15a is reduced. When the display device 10 is installed in the second orientation as illustrated in FIG. 4B, the proximity sensor 15a is not adjusted.

In the present embodiment, adjusting the sensitivity of the proximity sensors 15a or 15b is not the only option to set the detection range of the proximity sensors 15a or 15b. Alternatively, the display device 10 may change a determination threshold value based on which the controller 11 determines proximity. For example, when the detection range of the proximity sensor 15a is to be reduced, the controller 11 can set a determination threshold value for an electric signal from the proximity sensor 15a to be larger than the determination threshold value for the proximity sensor 15b. The determination threshold value is set with respect to the intensity of the signal detected by the proximity sensor 15a, 15b and/or its detection time, etc. As the result of changing the determination threshold value, it becomes less likely to determine that an object is in proximity based on the detection signal from the proximity sensor 15a than the detection signal from the proximity sensor 15b. Therefore, the detection range of the proximity sensor 15a can be substantially reduced.

In the present embodiment, in addition to reducing the sensitivity of the proximity sensor 15a or 15b whose detection range is blocked, the detection range of the proximity sensor 15a or 15b whose detection range is not blocked may be increased. As a result, the detection range of one proximity sensor 15a or 15b whose sensitivity has been reduced can be supplemented by the other proximity sensor 15a or 15b.

1-4. Characteristics

The display device 10 sets a detection range of the proximity sensor 15a or 15b according to an installation orientation of the display main body 10a. Therefore, even if the installation orientation of the display main body 10a differs depending on an installation condition for the display device 10, it is possible to maintain a proper detection of the proximity sensors 15a, 15b.

Since the display device 10 can set a detection range of the proximity sensors 15a and 15b to meet a variety of installation conditions, the display device 10 itself is not required to change its design or the like, and therefore cost can be reduced.

2. Other Embodiments

As described above, embodiments have been described as examples of the techniques disclosed in the present application. However, the present disclosure is not limited to these techniques, and can also be applied to embodiments in which changes, replacements, additions, omissions, and the like are appropriately made. Moreover, it is also possible to combine a component in one embodiment with a component in another embodiment and present a new embodiment.

2-1

The display device 10 may set the detection range of the proximity sensors 15a or 15b without communication with the server 30. In this case, the display device 10 holds in advance the sensor setting information 351 (FIG. 10A) in the memory 12 or other storage device. The display device 10 determines its installation orientation based on an output signal from the accelerometer 16, refers to the sensor setting information 351, and reduces the sensitivity of the proximity sensor 15a or 15b according to the determined installation orientation.

2-2

The proximity sensor may be, instead of an infrared proximity sensor, a transmission type photoelectric sensor, a direct reflection type photoelectric sensor, a mirror reflection type photoelectric sensor, a high frequency oscillation type proximity sensor, a capacitance type proximity sensor, a magnetic type proximity sensor, or the like.

The proximity sensors 15 may be disposed on the left and right of the display main body 10a in addition to or instead of being disposed on the top and bottom thereof.

The proximity sensor 15 is not limited to having a detection range in front of the display main body 10a, but may have a detection range covering the other areas around the display device 10. For example, the proximity sensor 15 may be disposed to have a detection range covering an area on the upper, lower, right, and/or left side of the display main body 10a or behind the display main body 10a depending on an installation state of the display device 10.

2-3

The display device 10 may detect the installation orientation by a gyro sensor instead of the accelerometer 16.

Instead of the accelerometer 16 or such other means, the display device 10 may acquire information indicating an installation state by the following means and set the detection range of the proximity sensor 15 according to the acquired information.

For example, an installation location of the display device 10 may be acquired in advance. The installation location includes a height from a floor surface of the space where the display device 10 is installed to the display device 10 and a distance from the surrounding walls. The detection range of the proximity sensor 15 is then set according to the acquired installation location. In this case, the detection range of the proximity sensor 15 may be set in consideration of installation conditions which have been described above and/or will be described later.

The information indicating the installation location or the installation orientation may be input by a person, or may be determined based on the images acquired from the camera 14 and/or surrounding cameras, which are an example of the state detection unit.

2-4

The space where the display device 10 is installed can have a variety of installation conditions such as a dent or an overhanging structure of a lower side, a right side, a left side, an upper side, etc. Due to the variation of installation conditions, the proximity sensor 15 that needs to be adjusted also differs. For example, in such a structure that a lower wall protrudes, the sensitivity of the proximity sensor 15b is reduced when the display device is in the installation orientation as illustrated in FIG. 4A, and the sensitivity of the proximity sensor 15a is reduced when the display device is in the installation orientation as illustrated in FIG. 4B. Further, the space may have an installation condition that does not require adjustment of the proximity sensor 15. Therefore, the server 30 or the display device 10 may add information indicating installation conditions to the sensor setting information as illustrated in FIG. 10A to have sensor setting information corresponding to each installation condition. For example, the sensor setting information corresponding to the installation condition "structure with an overhanging upper wall" is as illustrated in FIG. 10A. Opposite to this, the sensor setting information corresponding to the "structure with an overhanging lower wall" is as described above. In the case of installation conditions that do not require adjustment of the proximity sensor 15, the sensor setting information may be set to be all default values.

2-5

The display device 10 is one example and may be another electronic device.

The display device 10 is not limited to being installed in an aircraft. The display device 10 may be installed in a space inside a vehicle such as a train, a bus, or a ship. Further, the space in which the display device 10 is installed is not limited to that in a vehicle, and may be in a building. The space may be any other space that provides installation conditions.

The controller 11 and controller 31 may be configured by any processor such as a CPU, MPU, GPU, DSP, FPGA, or ASIC. The controller 11 and the controller 31 may be composed of one or a plurality of processors, respectively.

The scope of the present disclosure includes a computer program for causing a computer to execute processes for the display device 10 and the server 30, a method for such processes, and a computer-readable recording medium on which the computer program is recorded. Here, an example of the computer-readable recording media includes a floppy disk, a hard disk, a CD-ROM, an MO, a DVD, a DVD-ROM, a DVD-RAM, a BD (Blu-ray Discs), and a semiconductor memory. The computer program described above is not limited to being recorded on the recording medium described above; the computer program may be acquired via an electric communication line, a wireless or wired communication line, a network typified by the Internet, etc.

In the present disclosure, the system, apparatus or device may include a plurality of components (devices, modules (parts), etc.), and it does not matter whether all the components are in a single housing or not. Therefore, a "device" or "system" may refer to a plurality of devices located in separate housings and connected to each other via a network as well as a single device in which a plurality of modules are disposed in one housing. The server 30 may be composed of software, a platform, or an infrastructure provided by cloud computing.

When a plurality of processes are included in one step, the plurality of processes included in the one step can be executed by one device or shared by a plurality of devices.

REFERENCE NUMERALS

1: Electronic system
3: Network
10: Display device
10a: Display main body
11: Controller
12: Memory
13: Communication unit
14: Camera
15a: Proximity sensor
15b: Proximity sensor
16: Accelerometer
17: Display unit
18: Touch panel
19: Connection terminal
20: Surface member
30: Server
31: Controller
32: Memory
33: Communication unit
35: Storage unit
150: Screen
351: Sensor setting information
352: Display device installation information

The invention claimed is:

1. An electronic device configured to be installed in a plurality of positions with different installation directions in a given space, the electronic device comprising:
a main body;
one or more object sensors configured to detect an object around the main body;
a controller configured to set a detection range of the one or more object sensors according to a location of the main body in the given space,
wherein the detection range is set to result in maintaining proper operation of the one or more object sensors when the electronic device is installed in the given space.

2. The electronic device according to claim 1, wherein the controller is configured to set the detection range of the one or more object sensors by adjusting sensitivity of the one or more object sensors.

3. The electronic device according to claim 1, wherein the controller is configured to set the detection range of the one or more object sensors by changing a determination threshold value for an electric signal from the one or more object sensors.

4. The electronic device according to claim 1, wherein the one or more object sensors include a first sensor and a second sensor disposed at different positions, and
the controller is configured to set the detection range of one of the first sensor or the second sensor to be different from other one of the first sensor or the second sensor according to the installation state of the main body.

5. The electronic device according to claim 4, wherein the first sensor and the second sensor are disposed vertically in a state where the main body is installed in the given space.

6. The electronic device according to claim 1, wherein the controller is configured to set the detection range of the one or more object sensors according to a height in which the electronic device is located in the given space.

7. The electronic device according to claim 1, comprising a display unit configured to display information, wherein
the one or more object sensors are configured to detect an object in front of the display unit, and
the controller is configured to determine a presence or an absence of an input operation according to an electric signal from the one or more object sensors, the controller being configured to cause the display unit to display the information according to the input operation.

8. An electronic system comprising:
one or more electronic devices according to claim 1; and
a server configured to connect to the one or more electronic devices,
wherein the server is configured to
acquire information indicating the installation state of the main body of each of the one or more electronic devices in the given space, and
request each of the one or more electronic devices to set the detection range of the one or more object sensors according to the installation state.

9. The electronic system according to claim 8, wherein
the server includes a storage unit configured to store sensor setting information, and
the sensor setting information includes information for setting the detection range of the one or more object sensors corresponding to the installation state of each of the one or more electronic devices.

10. A sensor setting method for the electronic device according to claim 1 the sensor setting method comprising:
setting a detection range of the one or more object sensors according to a location of the main body in the given space.

11. The electronic device according to claim 1, wherein the electronic device is a display device and the main body is a display panel.

12. The electronic device according to claim 1, further comprising a monitor, wherein the one or more object sensors and the monitor face to the same direction.

13. The electronic device according to claim 1, further comprising:
one or more direction sensors configured to detect an installation direction of the main body, wherein
the controller is further configured to set a detection range of the one or more object sensors according to the installation direction of the main body detected by the one or more direction sensors.

14. An electronic device configured to be installed in a plurality of positions with different installation directions in a given space, the electronic device comprising:
a main body;
one or more object sensors configured to detect an object around the main body;
a controller configured to set a detection range of the one or more object sensors according to a location of the main body in the given space,
further comprising a screen, wherein the controller is configured to turn on the screen upon making a determination that a user's hand is in proximity to the screen based on an electric signal from the one or more object sensors.

* * * * *